US005877495A

United States Patent [19]

Takada et al.

[11] Patent Number: 5,877,495

[45] Date of Patent: Mar. 2, 1999

[54] MASS SPECTROMETER

[75] Inventors: Yasuaki Takada, Kokubunji; Minoru Sakairi, Kawagoe; Atsumu Hirabayashi, Kokubunji; Hideaki Koizumi, Tokyo, all of Japan

[73] Assignee: Hitachi, Ltd., Tokyo, Japan

[21] Appl. No.: 511,804

[22] Filed: Aug. 7, 1995

[30] Foreign Application Priority Data

Aug. 10, 1994 [JP] Japan .................................... 6-188556

[51] Int. Cl.[6] ............................ B01D 59/44; H01J 49/00

[52] U.S. Cl. ............................................................ 250/288

[58] Field of Search .................................... 250/281, 282, 250/288, 288 A, 423 R

[56] References Cited

U.S. PATENT DOCUMENTS

| | | | |
|---|---|---|---|
| Re. 34,757 | 10/1994 | Smith et al. | 250/288 |
| 4,705,616 | 11/1987 | Andresen et al. | 250/288 |
| 4,888,482 | 12/1989 | Kato | 250/288 |
| 4,994,165 | 2/1991 | Lee et al. | 250/288 A |
| 5,051,583 | 9/1991 | Mimura et al. | 250/288 |
| 5,170,052 | 12/1992 | Kato | 250/288 |
| 5,349,186 | 9/1994 | Ikonomou et al. | 250/288 |

OTHER PUBLICATIONS

R. Smith et al., "Improved Electrospray Ionization Interface for Capillary Zone Electrophoresis–Mass Spectrometry", *Analytical Chemistry*, vol. 60, No. 18, Sep. 15, 1988, pp. 1948–1952.

J. Wahl et al., "Use of small–diameter capillaries for increasing peptide and protein detection sensitivity in capillary electrophoresis–mass spectrometry", *Electrophoresis*, vol 14, 1993, pp. 448–457. No Month.

*Primary Examiner*—Bruce Anderson

*Attorney, Agent, or Firm*—Antonelli, Terry, Stout & Kraus, LLP

[57] ABSTRACT

A mass spectrometer comprising a capillary electrophoresis region for separating a solution containing molecules of sample by capillary electrophoresis in a capillary, a nebulization region for nebulizing the solution containing molecules of the sample under an atmospheric pressure from the end of the capillary and forming liquid droplets of the solution containing the molecules of the sample, a vaporization region for vaporizing the liquid droplets under an atmospheric pressure to form gaseous molecules of the sample, a chemical ionization region for forming ions relevant to the molecules of the sample under the atmospheric pressure or the reduced pressure by a chemical reaction between the ions attributable to the gaseous molecules present in the atmosphere and the gaseous molecules of the sample, and a vacuum region having a sample aperture for introducing the ions formed by the chemical ionization means and incorporating a mass analysis region for mass analysis of ions introduced from the sample aperture. The mass spectrometer is combined with the capillary electrophoresis apparatus and is particularly suitable to formation and mass analysis of ions relevant to the neutral molecules of the sample.

7 Claims, 11 Drawing Sheets

MASS SPECTROMETER

BACKGROUND OF THE INVENTION

The present invention concerns a mass spectrometer combined with a sample separation apparatus used for separation and analysis of mixed biological samples, for example, sugar, peptide and protein.

In the field of analysis, an importance has been attached to the development of mass spectrometry for biological compounds at present. Since the biological compounds are usually dissolved as a mixture in a solution, development has been progressed to a mass spectrometer combined with the sample separation apparatus for separating the mixture. As a typical example, there can be mentioned a combined apparatus of capillary electrophoresis apparatus-mass spectrometer utilizing capillary electrophoresis for the separation of the sample. The capillary electrophoresis is excellent in the separation of the mixture but can not identify substances. On the other hand, the mass spectrometer has a high analyzing sensitivity and is excellent for the ability of identifying substances but analysis of the mixture is difficult. In view of the above, a sample is separated by the capillary electrophoresis apparatus and the separated sample is analyzed by the mass spectrometer. Thus, the mass spectrometer combined with the capillary electrophoresis apparatus is much effective for the analysis of a mixture.

An existent mass spectrometer combined with the capillary electrophoresis apparatus described above is described in Analytical Chemistry, 60, 1948 (1988). The existent mass spectrometer will be explained with reference to FIG. 13. In the mass spectrometer of the prior art, an electrospray ionization method is used for ionization of a sample. A capillary 1 is a fused-silica capillary having an outer diameter of about several hundreds micrometer and an inner diameter of about several tens micrometer. The inside of the capillary 1 is filled with a buffer solution. A sample solution is introduced from one end 2*a* to the inside of the capillary 1. After introduction of the sample solution, the end 2*a* is kept in a buffer vessel 4 filled with a buffer solution 3. The other end 2*b* of the capillary 1 is inserted to the inside of a metal tube 5. Generally, a flow rate of a buffer flowing through the capillary is small and it is often difficult to nebulize the sample solution stably and continuously. Then, a sheath liquid 6 is introduced in a gap between the capillary 1 and the metal tube 5 for assisting nebulization. When a high voltage is applied from a high voltage power source 7*a* between one end 2*a* of the capillary 1 and the metal tube 5, since the end 2*b* of the capillary 1 is electrically connected by way of the sheath liquid 6 with the metal tube 5, a high voltage is applied between both ends 2*a* and 2*b* of the capillary 1. Thus, the sample is sent to the end 2*b* while undergoing electrophoretic separation in the capillary 1.

The sample reaching the end 2*b* is mixed with the sheath liquid 6 and then electrosprayed by a voltage applied between the metal tube 5 and an opposing electrode 8*a* by power source 9 for a nebulizer. Ions relevant to the sample molecules are contained in droplets formed by the electrospray. The ions relevant to the sample molecules are entered through a sampling aperture 10*a* into a differential pumping region 12 evacuated by an evacuation system 11*a* and, further, enter a vacuum region 13 evacuated to a high vacuum degree by a vacuum system 11*b*. The ions entering the vacuum region 13 are subjected to mass separation in a mass analysis region 14 and the mass-separated ions are detected by an ion detector 15. A detection signal from the detector 15 is sent by way of a signal line 16 to a data processing apparatus 17 and put to data processing to obtain a result of mass spectrometry for the sample substance.

In the existent mass spectrometer combined with the capillary electrophoresis apparatus described above, electrospray ionization is used for ionization of the sample. The electrospray ionization is a method of taking out highly polar substances such as protein or peptide present as ions in a solution as gaseous ions. Therefore, neutral substances not possessing charges in the solution can not be detected at a high sensitivity in the mass spectrometer combined with the existent capillary electrophoretic apparatus. Since such neutral substances include, for example, amines in various kinds of medicines and neutrotransmitters, it is extremely important to analyze electrically neutral samples for the study in the field of biotechnology or medicine.

Further, as one of methods for separation of samples by capillary electrophoresis, micellar electrokinetic chromatography has been known. In the micellar electrokinetic chromatography, micelles are formed by adding a surfactant to a buffer solution, and a neutral substance not having charges is separated by utilizing the difference of distribution when each of the sample compounds is distributed in the micelles. Also in this case, for extending an application range of the mass spectrometer combined with the capillary electrophoresis apparatus, it has been desired for the development of an apparatus capable of analyzing, at a high sensitivity, neutral substances having no charges in the solution.

Further, the ion intensity obtained by the existent electrospray ionization method is approximately given by the following equation (J. H. Wahl, et al., Electrophoresis, 14 448 (1993)).

$$I(A^+) \propto V(A^+)/V(C^+) \quad (1)$$

where $I(A^+)$ represents a signal intensity of ion $A^+$ as an object of analysis, $V(A^+)$ represents a flow rate of ion $A^+$ to be analyzed, and $V(C^+)$ represents a flow rate of contaminant ions other than ion $A^+$ to be analyzed. Accordingly, for attaining mass spectrometry at a high sensitivity by using the electrospray ionization method, it is important to remove contaminant ion $C^+$ in the sample solution.

On the other hand, in the capillary electrophoresis method, a method of adding a salt at high concentration in a buffer solution for electrophoresis is generally used for preventing sample molecules from adsorbing on wall surfaces or the like. Accordingly, since contaminant ions (for example, $Na^+$, $K^+$) formed by dissociation of the salt are contained in a great amount in the ions obtained by electrospray, the denominator: $V(C^+)$ in the formula increases remarkably to reduce the signal intensity of the ion as an object of the analysis. Accordingly, in the existent mass spectrometer employing electrospray for the ionization of the sample, it was difficult to obtain a signal of the ion as an object of analysis at a sufficient intensity.

Further, in micellar electrokinetic chromatography, analysis is effected by forming micelles of a surface active agent such as SDS (sodium dodecyl sulfate) in a buffer. For forming the micelles, it is necessary to add a surfactant at a concentration exceeding a critical value (critical micelle concentration) in the buffer. Under micelle-forming conditions, cations and anions liberated from the surfactant are present in a great amount as contaminant ions in the buffer. Therefore, in the existent apparatus using the electrospray ionization method, measurement of the sample molecular ions is difficult by the effect of the contaminant ions.

With the reasons described above, it has been strongly demanded for providing a mass spectrometer combined with a sample separation apparatus such as a capillary electrophoresis apparatus improved so as to less undergo the effect of the salt in the buffer.

SUMMARY OF THE INVENTION

A first object of the present invention is to provide a mass spectrometer capable of separating an electrically neutral substance present in a solvent which was difficult to be ionized by an existent electrospray ionization method and analyzing the same at a high sensitivity.

A second object of the present invention is to provide a mass spectrometer capable of using, to a sample separation apparatus, a buffer for electrophoresis which was difficult to be used in an existent mass spectrometer combined with a capillary electrophoresis apparatus.

In accordance with the present invention, a sample solution is separated by using a sample separation apparatus such as a capillary electrophoresis apparatus, the separated sample solution is nebulized by flowing from a capillary, gaseous sample molecules formed by vaporization of liquid droplets resulting from nebulization are ionized by chemical reaction, and the ions of the thus obtained sample molecules are subjected to mass spectrometry in a mass analysis region. The nebulization, vaporization and ionization are conducted in an air under an atmospheric pressure or a reduced pressure.

FIG. 1 shows a basic constitution of a mass spectrometer according to the present invention by using a capillary electrophoresis apparatus as a sample separation apparatus. In FIG. 1, a sample separated in a capillary electrophoresis region 18 is nebulized together with a buffer solution in a nebulization region 19. Liquid droplets formed by nebulization are vaporized in a vaporization region 20. Gaseous sample molecules formed in the vaporization region 20 are ionized in a chemical ionization region 21 by chemically reacting with ions derived from gaseous molecules present in the ionization region 21. For promoting the ionization by the chemical reaction, a corona discharging process to be described later may be used.

Ions relevant to the sample molecules obtained in the ionization region 21 enter by way of a sampling aperture 10*a* into a differential pumping region 12 evacuated by a vacuum system 11*a* and, further, enters passing through a sampling aperture 10*b* into a vacuum region 13 evacuated to a high vacuum degree by a vacuum system 11*b*. Ions entering the vacuum region 13 are put to mass separation in a mass analysis region 14 and detected by an ion detector 15. A detection signal from the ion detector 15 is sent by way of a signal line 16 to a data processing unit 17 for data processing.

The chemical ionization region 21 may be disposed in the differential pumping region 12. The inside of the differential pumping region 12 is kept at a pressure from several Pa to several hundred Pa. Accordingly, the sample molecules collide against gaseous molecule ions present in the differential pumping region to form ions of the sample molecules by the chemical reaction.

As the separation mode in the capillary zone electrophoresis region 18, there can be mentioned various modes such as capillary zone electrophoresis, capillary gel electrophoresis, capillary isoelectric focusing electrophoresis and micellar electrokinetic chromatography. In the capillary zone electrophoresis, a free solvent is filled in the capillary and the sample is separated due to the difference of the mobility of the sample. In the capillary gel electrophoresis, a gel is filled in the capillary and the specimen is separated by utilizing the molecular sieve effect of the gel. In the capillary iso-electric focusing electrophoresis, a gradient is provided to a hydrogen ion concentration in the capillary and the sample is separated depending on the difference of isoelectric point of the sample. In the micellar electrokinetic chromatography, micelles formed by adding a surface active agent to the buffer solution, and the sample is separated by utilizing the difference of distribution of the micelles to each of the sample compounds. In the present invention any of the separation modes described previously may be used.

In the nebulization region 19, the sample solution can be nebulized by using a nebulizing means using an electrospray means, nebulization by heating, pneumatic nebulization means or nebulization means using ultrasonic oscillator. In the vaporization region 20, the nebulized sample solution can be vaporized by using vaporization means such as a heated metal block or infrared irradiation.

In the chemical ionization region 21, ions relevant to sample molecules A are formed mainly by the following proton addition reaction or proton elimination reaction assuming the sample molecule as an object of analysis as A and gaseous molecules chemically reacting therewith as B:

$$A+BH^+\rightarrow AH^++B \text{ (proton addition reaction)} \quad (2)$$

$$A+B^-\rightarrow(A-H)^-+BH \text{ (proton elimination reaction)} \quad (3)$$

For instance, hydronium ion ($H_3O^+$) or cluster ion thereof [$H_3O^+(H_2O)_n$] are formed by generating corona discharge in atmospheric air. The thus formed ions react with the sample molecules A as shown below to form ions $AH^+$ relevant to the sample molecule A:

$$A+H_3O^+\rightarrow AH^++H_2O \quad (4)$$

$$A+H_3O^+(H_2O)_n\rightarrow AH^++(n+1)H_2O \quad (5)$$

In this way, when the sample solution reaching the exit end of the capillary is nebulized and the resultant gaseous sample molecules are ionized by the chemical reaction, ions relevant to the sample molecules not having charges in the solution can be obtained. When the thus obtained ions are subjected to mass analysis in the mass analysis region, sample molecules having no charges in the solution can be analyzed. As a result, the application range of the mass spectrometer combined with the capillary electrophoresis apparatus can be extended remarkably.

Further, in an existent mass spectrometer using the electrospray ionization method, ionic substances ionized in the solution can also be detected at a high sensitivity. On the other hand, in the present invention using the chemical ionization method by corona discharge, such ionizing substances are less detected rather. This is probably attributable to that since the ionic substances flies as gaseous ions toward the sampling aperture 10*a* merely by being nebulized (electrosprayed) in the nebulization region 19, the flying trace is bent by an electric field for generating corona discharge in the ionization region 21 and can not reach as far as the sampling aperture. That is, the sample molecules carrying no static charges and reaching as far as the ionization region 12 is at first ionized and analyzed by the chemical ionization method in the ionization region 21. Namely, the sample molecules that can be analyzed in the mass spectrometer according to the present invention are mainly neutral molecules in the solution, whereas the sample molecules that can be analyzed in the existent mass spectrometer are mainly ionic molecules in the solution. As described above, the mass spectrometer according to the present invention and the existent mass spectrometer have a so-called relationship complementary to each other. The mass spectrometer according to the present invention combined with the capillary electrophoresis apparatus has a low sensitivity to ions derived from a salt if it is incorporated in a buffer for electrophoresis. In addition, the range for the selection of the buffer solution can be extended in the mass spectrometer according to the present invention, compared with the existent mass spectrometer combined with the capillary electrophoresis apparatus. Accordingly, the application range of the mass spectrometer combined with the sample separation apparatus such as the capillary electrophoresis apparatus can be extended outstandingly according to the present invention. As the sample separation apparatus, liquid chromatographic apparatus can be used in addition to the capillary electrophoresis apparatus described above. Further, if separation of the sample solution is not necessary, the sample solution may be introduced by a flow injection method into the capillary and then nebulized from the exit of the capillary.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

The present invention will be explained more specifically by way of preferred embodiments with reference to the accompanying drawings.

EXAMPLE 1

Figure 1:
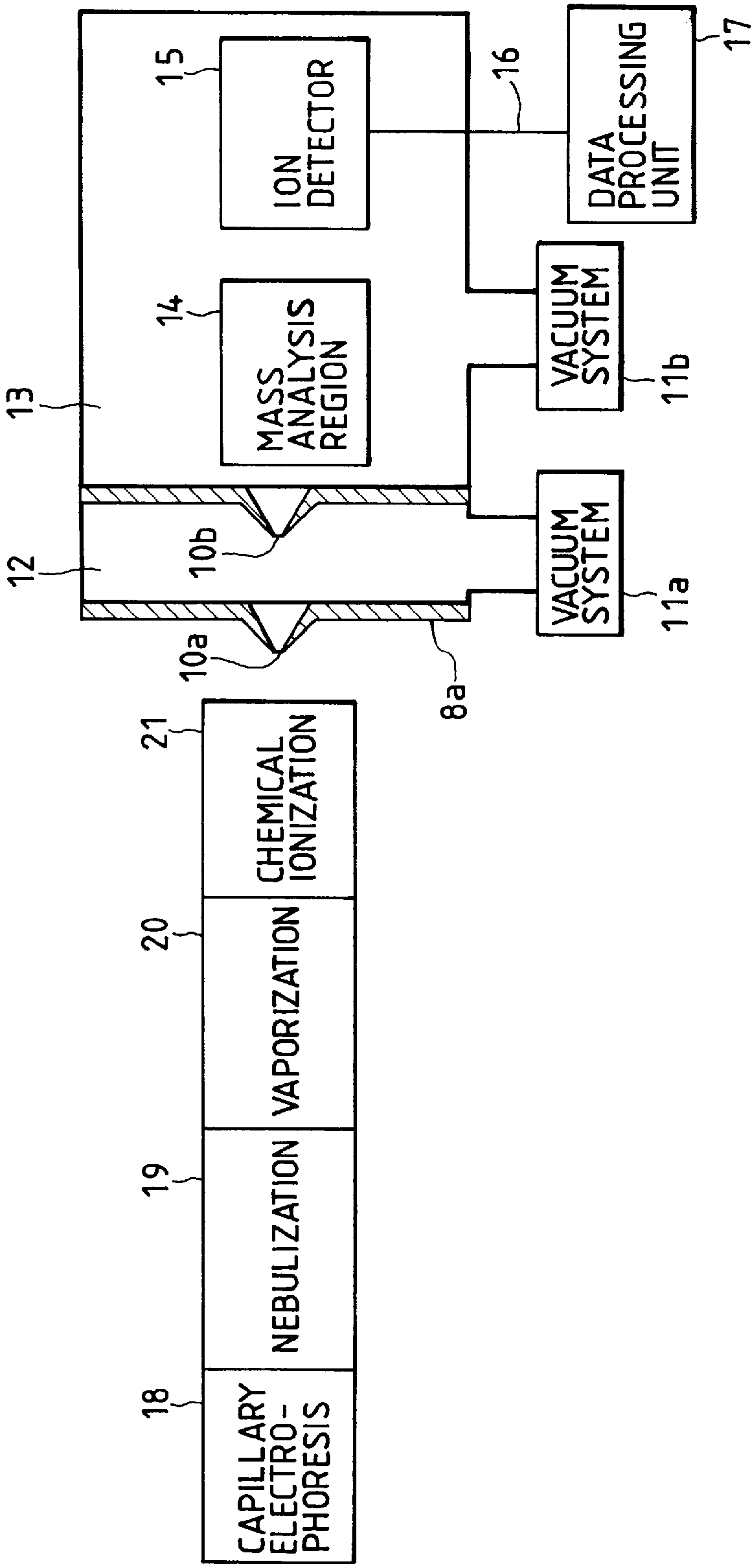
FIG. 1 is a view illustrating a basic constitution of a mass spectrometer combined with a capillary electrophoresis apparatus in accordance with the present invention.
Figure 2:
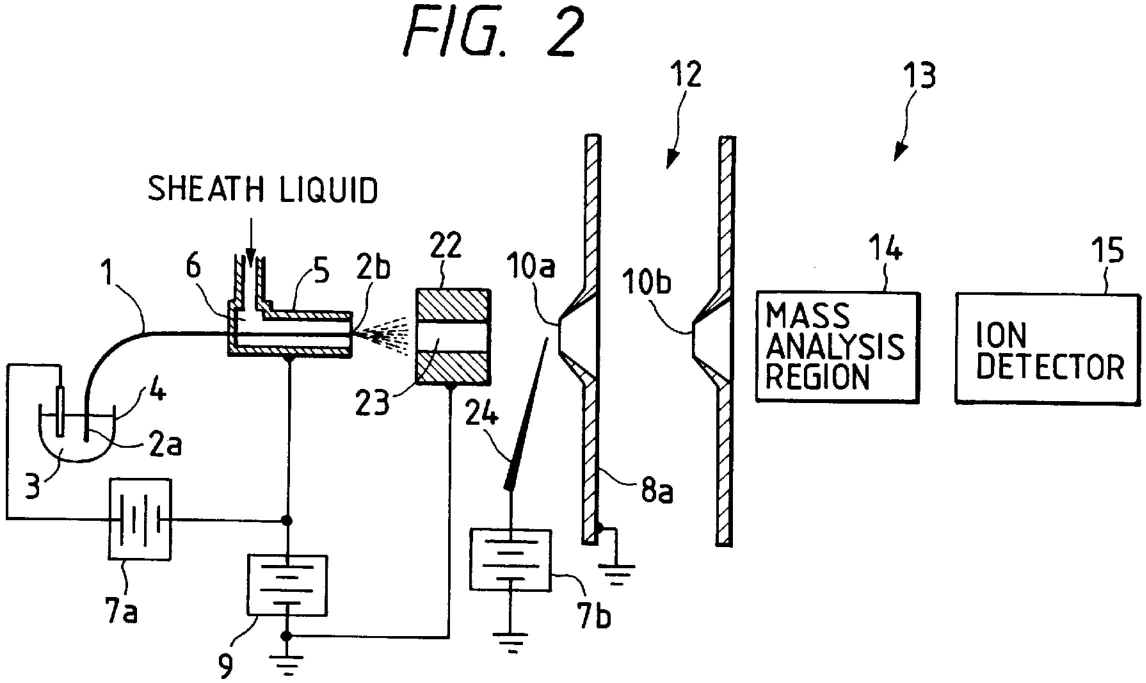
FIG. 2 is a view illustrating a schematic constitution of a mass spectrometer as a preferred embodiment according to the present invention.

FIG. 2 shows a first embodiment according to the present invention. In this embodiment, a nebulization method by electrospray method is used in the nebulization region 19 in the basic constitution shown in FIG. 1, and a vaporization method by a heated metal block is used for the vaporization region 20. A buffer solution is filled in the inside of a fused-silica capillary 1 having a several tens micrometer inner diameter and a several hundreds micrometer outer diameter. A sample solution is introduced from one end 2*a* to the inside of the capillary 1. After introduction of the sample solution, the end 2*a* is kept in a buffer solution vessel 4 filled with a buffer solution 3. The other end 2*b* of the capillary 1 is inserted in the inside of a metal tube 5. An electroconductive solution such as water, organic solvent or a mixed solution thereof is introduced as a sheath liquid 6 into a gap between the capillary 1 and the metal tube 5 for assisting nebulization at a flow rate of several micrometers per minute. When a high voltage at about several tens kV is applied between one end 2*a* of the capillary 1 and the metal tube 5 from a high voltage power source 7*a*, since the other end 2*b* of the capillary 1 is electrically connected with the metal tube 5 by way of the nebulization sheath liquid 6, the voltage is applied between both ends 2*a* and 2*b* of the capillary 1. Accordingly, the sample is sent toward the end 2*b* while undergoing electrophoretic separation in the capillary 1. The sample, when it reaches the end 2*b*, is mixed with the sheath liquid 6 and then electrostatically sprayed (nebulized) by a high voltage at several KV applied from a power source 9 for a nebulizer between the metal tube 5 and a metal block 22. The metal block 22 is heated by a heater (not illustrated) to about 300° C. Liquid droplets of the sample formed by electrospray are heated and vaporized during passage through a through hole 23 in the metal block 22.

A needle electrode 24 is disposed near the sample aperture 10*a* of about 0.3 mm diameter disposed to an electrode 8*a*. A high voltage at several KV is applied to the needle electrode 24 from a high voltage power source 7*b*, by which corona discharge is generated between the needle electrode 24 and the electrode 8*a* (in atmosphere) to form primary ions such as hydronium ions. When the gaseous molecules of the sample formed by vaporization of the liquid droplets of the sample reach the corona discharging region, the gaseous molecules of the sample take place chemical reaction (proton addition reaction or proton elimination reaction) as shown in the formulae (2) and (3) described previously) with the primary ions such as hydronium ions formed by the corona discharge and ionized. The thus formed ions relevant to the sample molecules enter passing through the sample aperture 10*a* into a differential pumping region 12 evacuated to about several tens Pa to several hundreds Pa and are then taken into a vacuum region 13 evacuated to about $10^{-3}$ Pa passing through a sample aperture 10*b*. The ions taken into the vacuum region 13 are subjected to mass analysis region 14 and detected by an ion detector 15.

EXAMPLE 2

Figure 3:
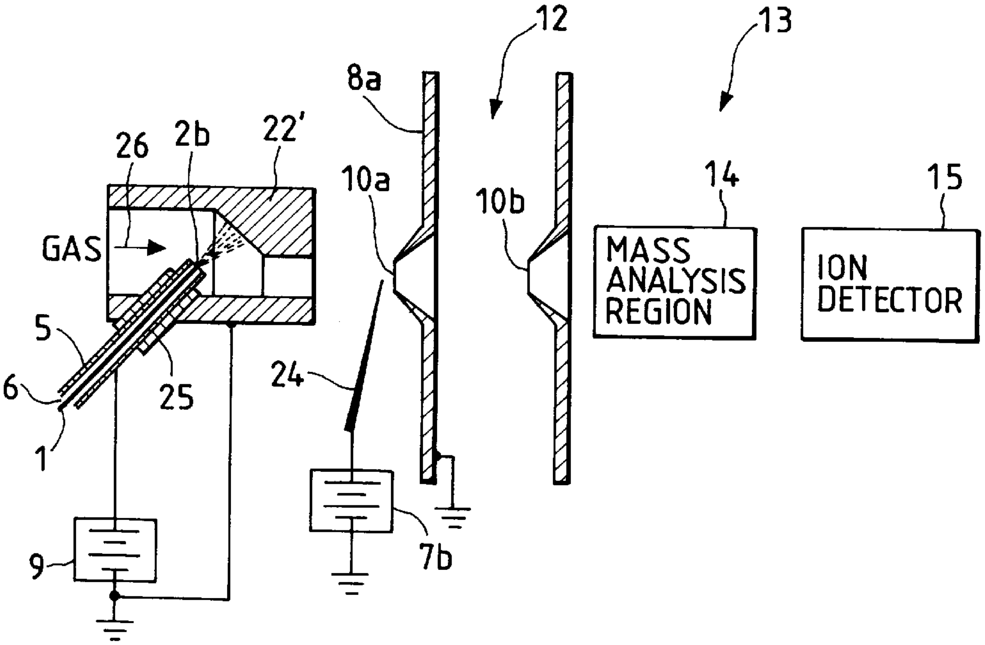
FIG. 3 is a view illustrating another embodiment according to the present invention, in which an exit end of a capillary is disposed in a vaporization region and a sample solution is adapted to be blown to a metal block disposed in the vaporization region.

FIG. 3 shows a second embodiment according to the present invention. In this embodiment, an exit end 2*b* of a capillary 1 is disposed in a vaporization region 20. As shown in FIG. 3, a sample solution from a capillary 1 is sprayed to a metal block 22' constituting a vaporization region. The sample solution is electrosprayed (nebulized) between a metal tube 5 and the metal block 22' surrounding the capillary 1 by a high voltage applied from a power source 9. The metal tube 5 and the metal block 22' are insulated from each other by an insulation tube 25. Liquid droplets of the sample blown to the metal block 22' heated to a temperature higher than the boiling point of the sample solution are instantaneously vaporized into a gaseous molecules of the sample. When the sample molecules reach a corona discharge region, they take place chemical reaction with primary ions such as hydronium ions formed by corona discharge, and the sample molecules are ionized. The thus obtained ions relevant to the sample molecules are introduced passing through a sample aperture 10*a* into a differential pumping region 12 evacuated to about several tens Pa to several hundreds Pa and, further, taken by way of a sample aperture 10*b* into a vacuum region 13 evacuated to about $10^{-3}$ Pa. The ions relevant to the sample molecules taken into the vacuum region 13 are subjected to mass analysis by a mass analysis region 14 and an ion detector 15. For improving the efficiency of the sample molecules to reach the ionizing region (corona discharge region), a gas 26 such as nitrogen or air is caused to flow from a gas reservoir to a through hole disposed in the metal block 22'. The gas 26 may also be caused to flow in the through hole under compression by a compressor. Gaseous molecules of the sample formed by electrospraying the sample solution to a portion of an inclined wall disposed in the through hole of the metal block 22' are transported efficiently by the flow of the gas 26 to the ionizing region (corona discharging region). The gas 26 is desirably heated previously to a temperature higher than a room temperature.

EXAMPLE 3

Figure 4:
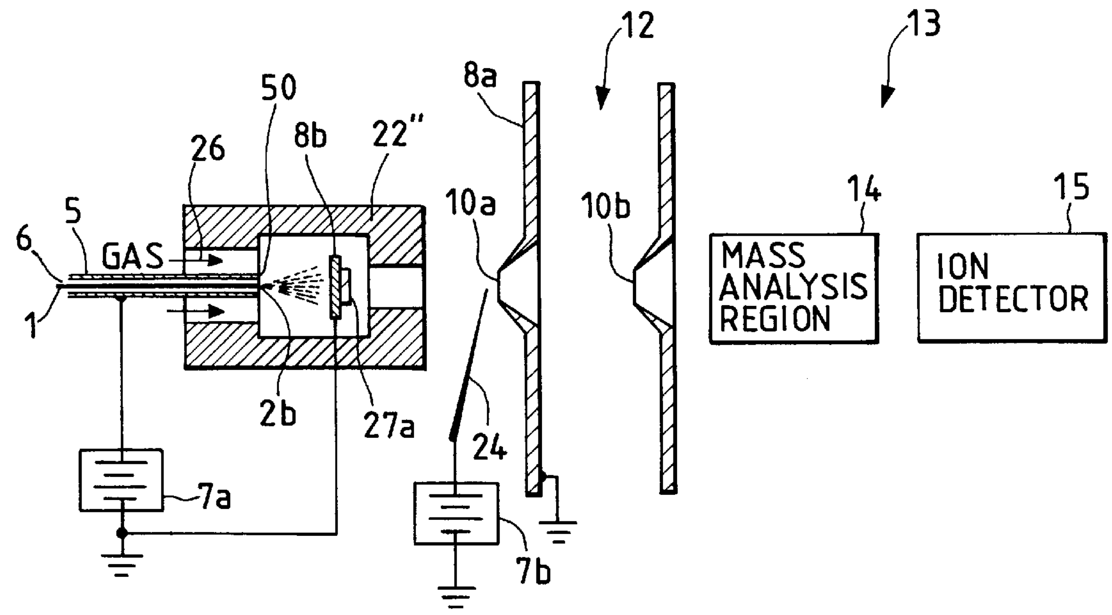
FIG. 4 is a view illustrating a further embodiment of the present invention in which an electrode is disposed for preventing large liquid droplet from reaching a chemical ionization region.

FIG. 4 shows a third embodiment according to the present invention. In the constitution shown previously in FIG. 2, when large liquid of the sample droplets are formed upon electrospray in a nebulization region 19, liquid droplets of the sample are sometimes not vaporized completely in the vaporization region 20 that employs a vaporization method using the heated metal block 22 but liquid droplets of the sample reach as they are to the ionization region (corona discharging region) 21. In such an instance, liquid droplets of the sample reaching the corona discharging region may possibly cause electric short-circuit between the needle electrode 24 and the electrode 8*a* to bring about a trouble, for example, to a high voltage power source 7*b*. In order to avoid this, in this embodiment, an electrode 8*b* is disposed between the distal end 50 of the metal tube 5 and the needle electrode 24 at a position of interrupting the liquid droplets such that they do not reach a chemical ionization region, and the sample solution is electrosprayed to the electrode 8*b*. In this case, it is desirable that the electrode 8*b* is heated by a heater 27*a* for improving the vaporization efficiency of the liquid droplets as shown in FIG. 4. With the constitution shown in FIG. 4, only the gaseous molecules going around the electrode 8*b* are transported to and ionized in the chemical ionization region. Since the liquid droplets are captured by the electrode 8*b*, short-circuit between the needle electrode 24 and the electrode 8*a* can be avoided. In FIG. 4, the shape of the electrode 8*b* is not restricted only to a plate but any shape, for example, a mesh-form may be adopted, providing that the liquid droplets can be captured. For improving the efficiency of the sample molecules to reach the chemical ionization region 21, a gas 26 may be caused to flow to the chemical ionization region 21 like that in FIG. 3.

Also in the apparatus shown in FIGS. 3 and 4, a sheath liquid 6 is introduced to a gap between the capillary 1 and the metal tube 5 for assisting nebulization.

EXAMPLE 4

Figure 5:
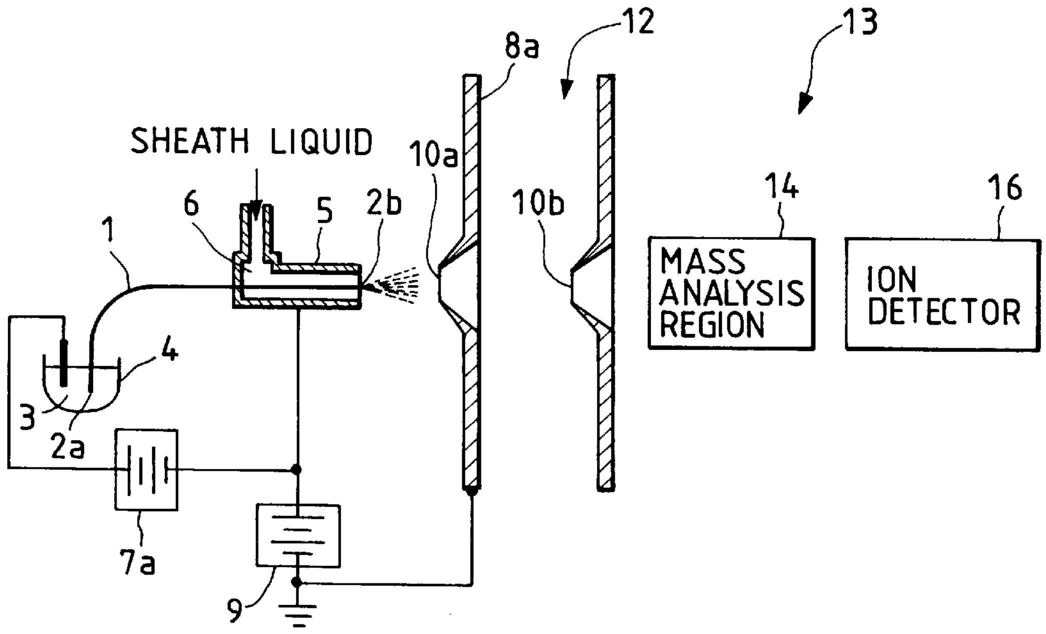
FIG. 5 is a view illustrating a further embodiment according to the present invention, in which corona discharge for chemical ionization is generated by using a metal tube for spraying a solution.

FIG. 5 shows a fourth embodiment according to the present invention. In a case where sample molecules as an object of measurement has a sufficiently high volatility and, accordingly, a sufficient amount of gaseous molecules of the sample is obtained only by nebulizing the sample solution, the vaporization region 20 may be omitted in the constitution shown in FIG. 1 to FIG. 4. Further, in a case of omitting the provision of the vaporization region 20, the needle electrode 24 shown in FIG. 2 to FIG. 4 may be omitted to further simplify the constitution of the apparatus. This embodiment shows such an example.

In the embodiment shown in FIG. 5, a high voltage is applied to a metal tube 5 for electrospraying a sample solution to cause corona discharge in a mass spectrometer using chemical ionization method for the ionization of sample molecules by using a capillary electrophoresis apparatus as a sample separation means. The sample solution reaching the distal end 2*b* of the capillary 1 is mixed with a sheath liquid 6 and then electrosprayed by a high voltage applied between a metal tube 5 and an electrode 8*a* from a power source 9 for nebulizer. When the voltage applied from the power source 9 to the metal tube 5 is set to about 6~10 kV, corona discharge is generated between the metal tube 5 and the electrode 8*a*. The sample solution is kept to be nebulized even under the condition where the corona discharge is generated. Accordingly, the gaseous molecules of the sample obtained by nebulization take place chemical reaction with ions generated due to gaseous molecules present in an atmospheric air by corona discharge, to obtain quasi molecular ions relevant to the sample molecules. The structure shown in FIG. 5 is identical with that of the existent apparatus shown in FIG. 13. In the structure of the present invention (shown in FIG. 5) is different from that of the existent apparatus (shown in FIG. 13) in that voltage applied between the metal tube 5 and the electrode 8*a* from the power source 9 is made higher as about 6 to 10 KV to cause corona discharge between the metal tube 5 and the electrode 8*a*.

EXAMPLE 5

Description will be made to a difference of mass spectrum obtained by the existent mass spectrometer shown in FIG. 13 and that obtained by the mass spectrometer according to the present invention shown in FIG. 2.

Concrete constitutions and measuring conditions for the apparatus shown in FIG. 2 used in this embodiment and the apparatus shown in FIG. 13 will be explained below.

One end of a fused-silica capillary 1 having 50 μm inner diameter and 150 μm outer diameter was inserted into a stainless steel tube 5 having 200 μm inner diameter and 400 μm outer diameter. An electrophoresis voltage at 10 kV was applied from a power source 7*a* between both ends of the capillary 1. A solution comprising an aqueous solution of 30 mM ammonium acetate and acetonitrile at 1:1 mixing ratio and at pH of 7.2 was used as an electrophoresis buffer. A mixed solution comprising water and methanol at 1:1 ratio was introduced at a flow rate of 2 μl/min to a portion between the capillary 1 and the stainless steel tube 5 as a sheath liquid 6 for assisting the nebulization. A voltage at about 3 kV was applied from an electrospraying power source 9 to the metal tube 5.

In the apparatus according to the present invention shown in FIG. 2, in addition to the conditions described above, a vaporization section comprising a metal block 22 heated to about 300° C. was provided, and liquid droplets obtained by electrospray were vaporized. A voltage at about 2.5 kV was applied from the power source 7*b* to the needle electrode 24 to generate corona discharge in the vicinity of the sample aperture 10*a*. The sample molecules obtained by vaporization took place chemical reaction and were ionized with primary ions such as hydronium ions formed by the corona discharge.

Figure 6:
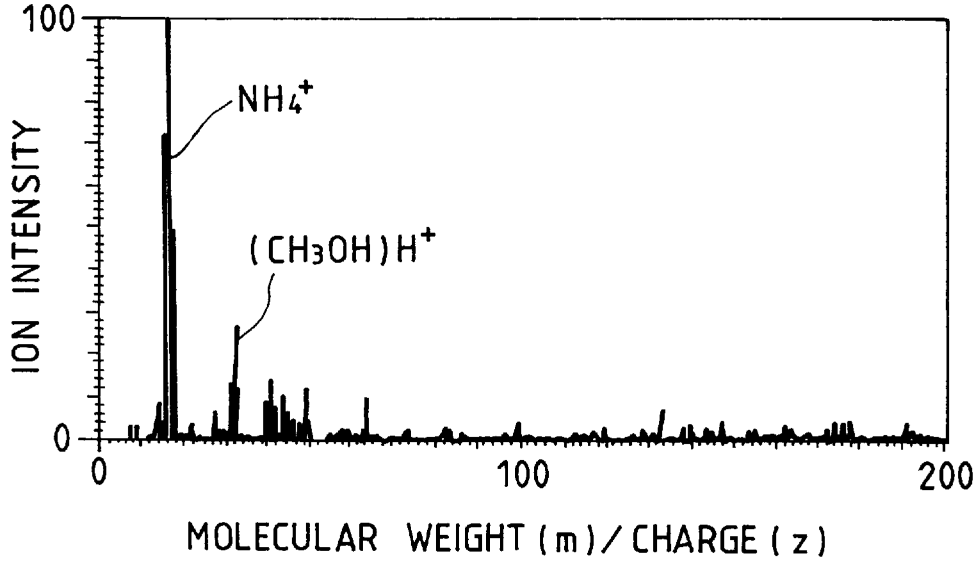
FIG. 6 is a view illustrating mass spectrum of a buffer measured by an existent mass spectrometer combined with a capillary electrophoresis apparatus.
Figure 7:
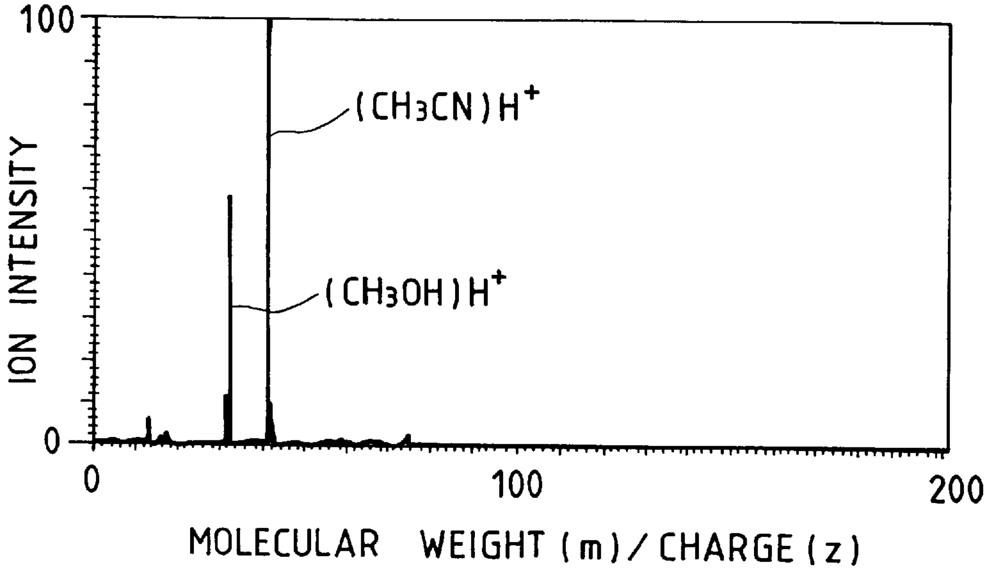
FIG. 7 is a view illustrating mass spectrum of a buffer measured by a mass spectrometer according to the present invention combined with a capillary electrophoresis apparatus.

FIGS. 6 and 7 show mass spectrum for the background obtained only when the buffer is nebulized. In both of the figures, a value (m/z) obtained by dividing the molecular weight m of the ions by the number of charges z is indicated on the abscissa, while an ion intensity is indicated on the ordinate based on the peak for the maximum intensity assumed as 100. FIG. 6 is a mass spectrum measured by an existent apparatus shown in FIG. 13 and FIG. 7 is a mass spectrum measured by the apparatus according to the present invention shown in FIG. 2. In the existent mass spectrometer as shown in FIG. 13, an ammonium ion derived from ammonium acetate added to the buffer is intensely detected as shown in FIG. 6. This is attributable to that the ammonium ions formed by dissociation of ammonium acetate in the solution are taken out in a gas phase by electrospray and detected. Since molecules of an organic solvent have lower polarity compared with ammonia molecules, they can not be detected at a high sensitivity by the existent electrospray method shown in FIG. 13 which is effective to the highly polar substance or ionic substance. On the other hand, in the mass spectrometer according to the present invention shown in FIG. 2, ammonium ions are not detected at all, but ions formed by addition of protons to molecules of an organic solvent such as acetonitrile or methanol are intensely detected as shown in FIG. 7. Such protonated ions are detected when the molecules of the organic solvent evaporated into a gaseous state are ionized in the chemical ionization region.

EXAMPLE 6

Results of measurement by the existent apparatus shown in FIG. 13 and the apparatus according to the present invention shown in FIG. 2 will be explained.

Figure 8:
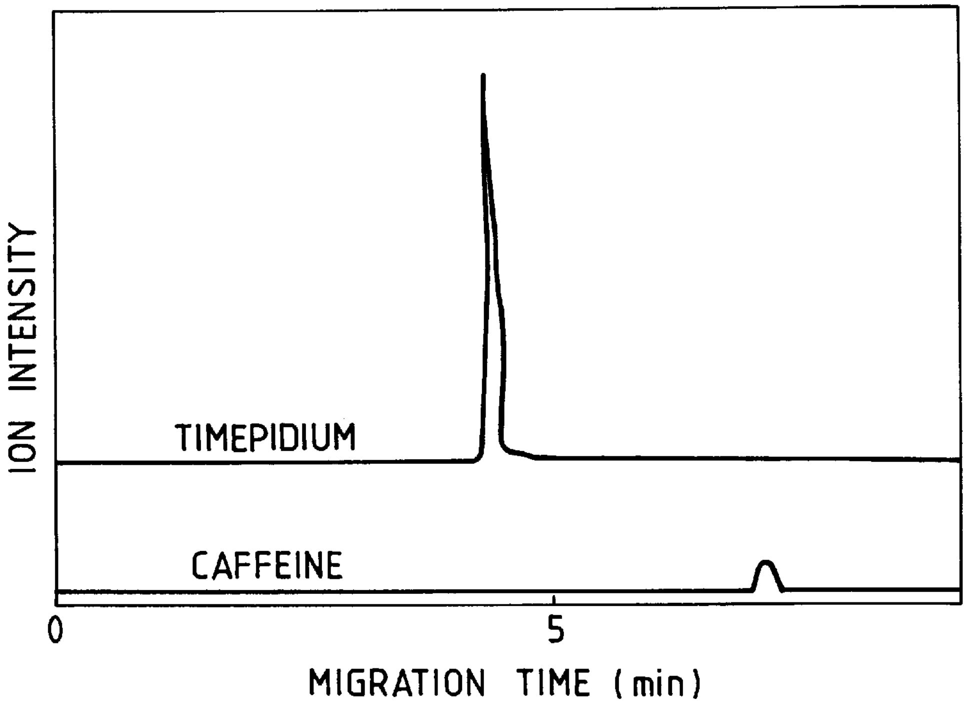
FIG. 8 is a view illustrating an electropherogram of a specimen measured by an existent mass spectrometer combined with a capillary electrophoresis apparatus.
Figure 9:
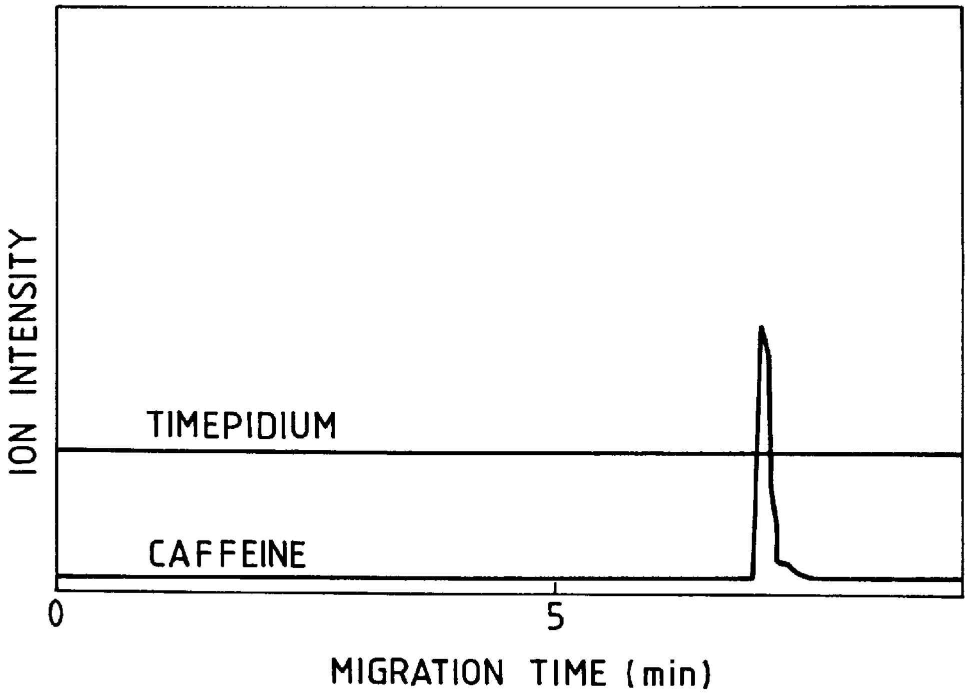
FIG. 9 is a view illustrating an electropherogram of a specimen measured by a mass spectrometer according to the present invention combined with a capillary electrophoresis apparatus.

A sample solution of timepidium which is an ionizing substance (concentration: $5\times10^{-4}$ mol/l) and a sample solution of caffeine which is a neutral substance not having charges in the solution (concentration: $5\times10^{-4}$ mol/l) were provided. One end 2*a* of the capillary 1 was inserted into a vessel containing the sample solutions and the sample solution was introduced gravitationally by about 3 nl into the capillary while keeping the end 2*a* at a position higher than the end 2*b* of the capillary 1 (hydrostatic injection method). Then, analysis was conducted while inserting and holding the end 2*a* of the capillary 1 in a vessel 4 containing a buffer 3. FIG. 8 shows the result of measurement by the existent apparatus shown in FIG. 13, while FIG. 9 shows the result of measurement by the apparatus according to the present invention shown in FIG. 2. As can be seen from FIG. 8, the ionic substance timepidium is intensely detected by the existent mass spectrometer shown in FIG. 13, whereas the detection intensity for the caffeine which is a neutral substance is weak. On the other hand, in the mass spectrometer according to the present invention shown in FIG. 2, as can be seen from FIG. 9, the caffeine which is a neutral substance is detected much more strongly than that in the case of the existent apparatus (FIG. 8), although the ionic substance timepidium is not detected at all. The ionizing substance timepidium is not detected by using the chemical ionization method in FIG. 9, perhaps because the ionizing substance is converted into gaseous ions merely by electrospray, and the gaseous ions can not reach the sample aperture 10*a* since the trace of the ions during advance to the sample aperture 10*a* is flexed by the corona discharging electric field formed by the needle electrode 24.

As can be seen from comparison between FIG. 6 and FIG. 7 and comparison between FIG. 8 and FIG. 9, the mass spectrometer according to the present invention can form and analyze ion species different from those in the existent mass spectrometer. Further, in the existent apparatus, when a salt is added to an electrophoresis buffer in a capillary electrophoresis apparatus combined with the mass spectrometer, a detection signal of the salt appears at a high intensity, and a signal intensity of molecule ions of the sample as an object of analysis is reduced, so that a salt at high concentration can not be added to the buffer. On the contrary, in the mass spectrum measured by the mass spectrometer according to the present invention, spectrum derived from the salt added to the buffer can be observed scarcely. Accordingly, in the mass spectrometer according to the present invention, a buffer solution containing various kinds of salts can be used in the capillary electrophoresis apparatus and the range for the selection of the buffer solution can be extended. As described above, the application range of the mass spectrometer combined with the sample separation apparatus can be extended outstandingly according to the present invention.

EXAMPLE 7

Figure 10:
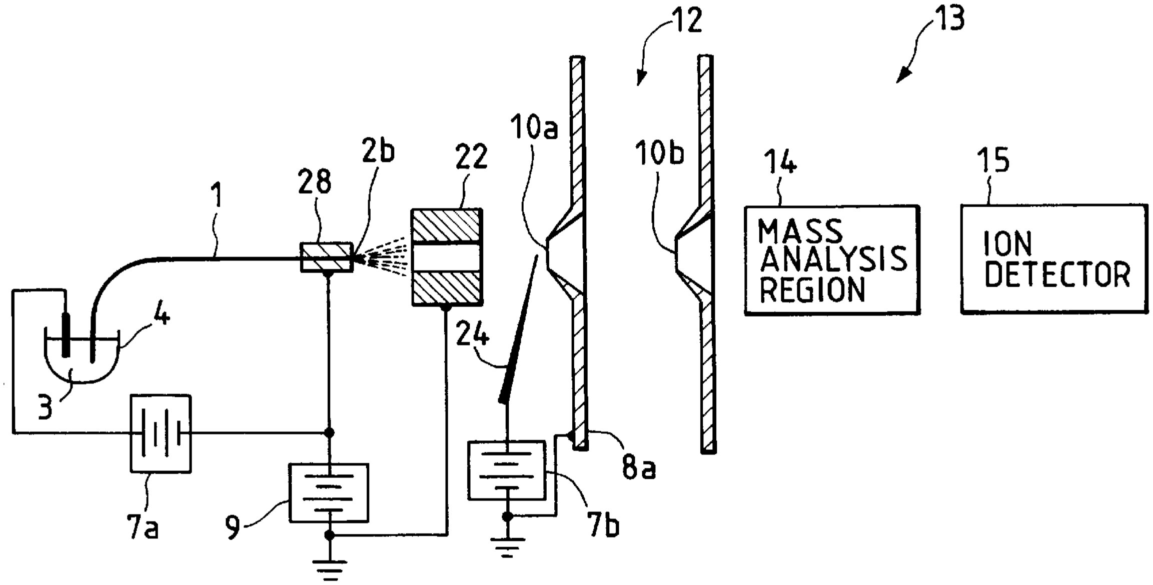
FIG. 10 is a view illustrating a further embodiment of the present invention constituted so as not to use a sheath liquid.

FIG. 10 shows a further embodiment according to the present invention. In a case were the flow rate of a buffer solution delivered from the end 2*a* of a capillary 1 is at a sufficient flow rate to stably maintain electrospraying, where the inner diameter of the capillary 1 is large or where the flow rate of an electroosmotic flow is fast, the sheath liquid 6 in the embodiments shown in FIG. 2 to FIG. 5 may be saved. This embodiment shows an example of not using the sheath liquid 6. A conductive coating 28 is applied to an outer wall in the vicinity of the end 2*b* of the capillary 1. Thus, the coating 28 and the inside of the capillary 1 are electrically connected at the end 2*b* of the capillary 1 by way of the sample solution. When a high voltage at several kV is applied from the power source 9 to the coating 28, the sample solution reaches the end 2*b* of the capillary 1 and is electrosprayed. Liquid droplets formed by electrospray are introduced into and vaporized in a vaporization region by a metal block 22 heated to about 300° C. in the same manner as in the embodiments shown in FIG. 2 to FIG. 5. The sample molecules formed by the vaporization are introduced into a chemical ionization region in which hydronium ions, etc are formed and ionized by corona discharge caused by a needle electrode 24 and ionized.

EXAMPLE 8

Figure 11:
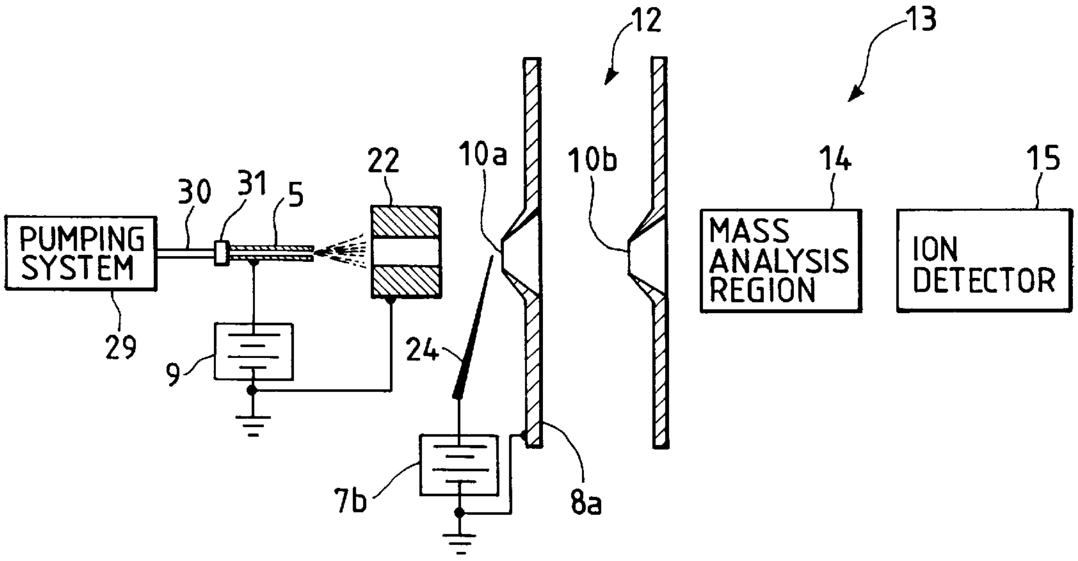
FIG. 11 is a view illustrating a further embodiment of the present invention in which a sample solution is introduced into a capillary by using a flow injection method.

FIG. 11 shows a further embodiment of the present invention. Also in a case of introducing a sample solution into a capillary 1 by a flow injection method, if it is necessary to supply the sample solution at a low flow rate, for example, by a reason because the amount of the sample solution is small, a method of using electrospraying and the atmospheric pressure chemical ionization as shown in FIGS. 2 to 5 and FIG. 10 is effective. FIG. 11 shows a constitution of a mass spectrometer in a case of conducting analysis by the flow injection method. A sample solution sent from a pumping system 29 comprising a pump or the like, is introduced by way of a tube 30 and a connector 31 in a metal tube 5. The sample solution is electrosprayed by applying a high voltage at about 2~10 kV between the metal tube 5 and heated metal block 22 from a power source 9. Liquid droplets of sample formed by nebulization are vaporized in a vaporization region by the heated metal block 22. The vaporized sample molecules take place chemical reaction and are ionized with hydronium ions or the like formed by corona discharge between a needle electrode 24 and an electrode 8*a*. Ions relevant to the sample molecules caused by the chemical reaction ionization are intaken by way of sample apertures 10*a*, 10*b* into a vacuum region 13 and subjected to mass separation in a mass analysis region 14 and detected by an ion detector 15. Accordingly, also in a case of conducting flow injection analysis at a low flow rate, the sample molecules can be ionized by chemical reaction and put to mass analysis.

In the apparatus shown in FIGS. 2 to 5 and FIGS. 10 and 11, electrospray method is used for nebulizing the sample solution, various means may be considered for the nebulizing method, such as nebulization by heating, pneumatic nebulization, nebulization by using ultrasonic oscillator or a method combining them. In the present invention, any of the nebulization methods described above can be used. Further, although the use of the heated metal block 22 is shown as a means for nebulizing the liquid droplets of the sample in each of the embodiments, a method of irradiating infrared rays to liquid droplets of the sample to vaporizing them by heating may also be used.

EXAMPLE 9

Figure 12:
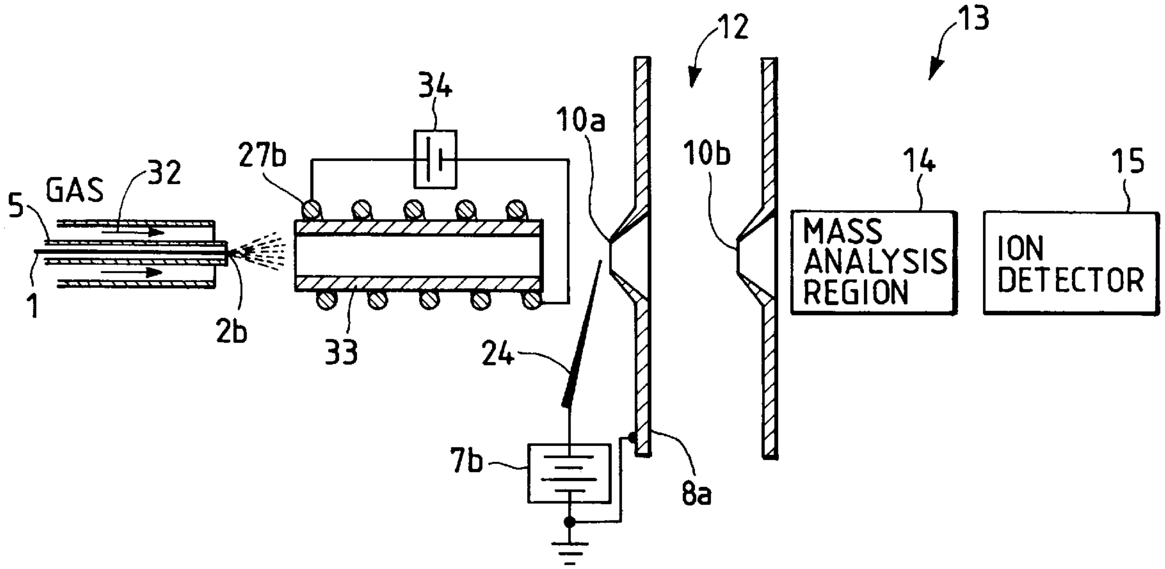
FIG. 12 is a view illustrating a further embodiment according to the present invention using pneumatic nebulization as a nebulization method in a nebulization region and using infrared irradiation as the nebulization method in the nebulization region.

FIG. 12 shows an embodiment of using the pneumatic nebulization method for nebulization of the sample solution and using infrared irradiation method for the nebulization of the liquid droplets of the sample. A sample solution reaching the distal end 2*b* of a capillary 1 is mixed with a sheath liquid in a metal tube 5 and then nebulized by a nebulizing gas 32. The liquid droplets obtained by nebulization are sent to a vaporization region. In the vaporization region, liquid droplets are vaporized by irradiation of infrared rays emitted from a heater 27*b* connected with a power source 34 to the liquid droplets. If there is a worry that the heater is deteriorated by direct contact of the liquid droplets with the heater 27*b*, a glass tube 33 may be disposed to the inside of the heater 27*b* for protecting the heater 27*b*. For improving the efficiency of vaporizing the liquid droplets, steam in the nebulizing gas 32 is desirably removed previously. Further, the nebulizing gas 32 is desirably heated to a temperature higher than a room temperature. Gaseous molecules of the sample obtained in the vaporization region take plate chemical reaction with hydronium ions or the like formed in a corona discharge region (chemical ionization region) by a needle electrode 24. Ions regarding or relevant to the resultant sample molecules are introduced by way of sample apertures 10*a*, 10*b* in a mass analysis region 14 kept at a high vacuum and then put to mass analysis.

EXAMPLE 10

Then, results of analysis for five kinds of dansyl amino acids (DNS-amino acids, A1~A5) and six kinds of cold medicine compounds (B1~B6) by a mass spectrometer according to the present invention having the constitution as shown in FIG. 2 will be explained. Table 1 shows reagents used and molecular weight thereof. Each of the sample concentrations is set at $5\times10^{-4}$ M.

TABLE 1

| No. | Reagent | Molecular weight |
|---|---|---|
| A1 | DNS-Tryptophan | 438 |
| A2 | DNS-Phenylalanine | 399 |
| A3 | DNS-Leucine | 365 |
| A4 | DNS-Threonine | 353 |
| A5 | DNS-Serine | 339 |
| B1 | Trimetoquinol | 345 |
| B2 | Timepidium | 320 |
| B3 | Isopropyl antipyrine | 230 |
| B4 | Caffeine | 194 |
| B5 | Ethenzamide | 165 |
| B6 | Acetaminophen | 151 |

In this embodiment, analysis was conducted in the constitution of the apparatus shown in FIG. 2 under the same concrete constitutions and measuring conditions as those in Example 5. The sample of about 3 nl was introduced into a capillary 1 by a hydrostatic injection method. Ammonium acetate/acetonitrile buffer (1/1, pH 7.2) was used as a mobile phase of electrophoresis. Since quasi molecular ions $(M+H)^+$ comprising proton $H^+$ added to the sample molecule M was obtained by corona discharge, measurement was conducted by setting the m/z value to (molecular weight +1). Other measuring conditions were the same as those in Example 5.

Figure 14:
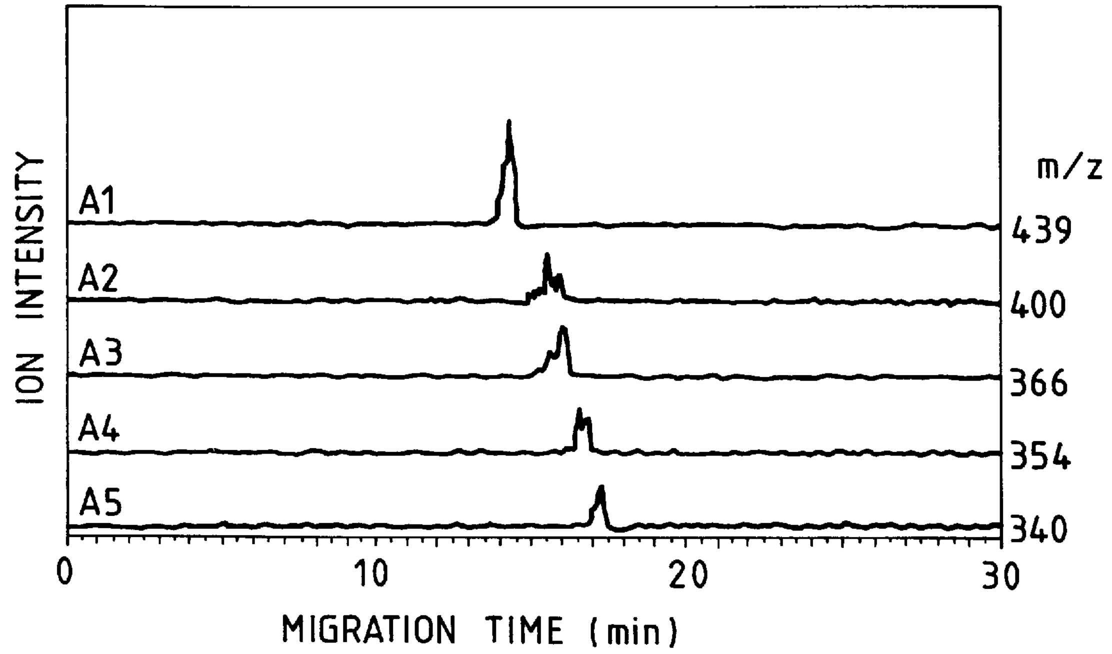
FIG. 14 is a view illustrating a result of measurement five kinds of dansyl amino acids by a mass spectrometer according to the present invention.

FIG. 14 shows results of measurement for dansyl amino acids. All of the five kinds of reagents used were neutral amino acid derivatives having no polar groups giving a strong effect on ionization. Five components could be separated by capillary electrophoresis and each of the sample compounds could be detected substantially at an identical ion intensity. In the capillary electrophoresis, if each of the sample compounds carry identical electric charges in the solution, a sample of lower molecular weight undergoes less resistance from the solution and, therefore, tends to show faster phoresis. In FIG. 14, the sample of larger molecular weight is detected earlier (at shorter phoresis time), probably because each of the sample compounds is charged negatively and electrophoretically moved toward the anode (direction to the end 2*a*). In the capillary electrophoresis, a flow is caused toward the cathode by electroosomosis (electroosmotic flow), and the flow rate of the electroosmotic flow is usually greater than the electrophoretic rate under usual phoretic condition in most cases. It is, accordingly, considered that since the direction of the electroosmotic flow is opposite to the direction of the electrophoresis of the sample and the sample compounds are sent to the cathode (direction of the end 2*b*), as a balance so that a molecule of sample compounds having a greater molecular weight of lower electrophoretic rate is detected earlier. In this way, neutral sample molecules can be separated efficiently and detected by the constitution of the apparatus according to the present invention shown in FIG. 2.

Figure 15:
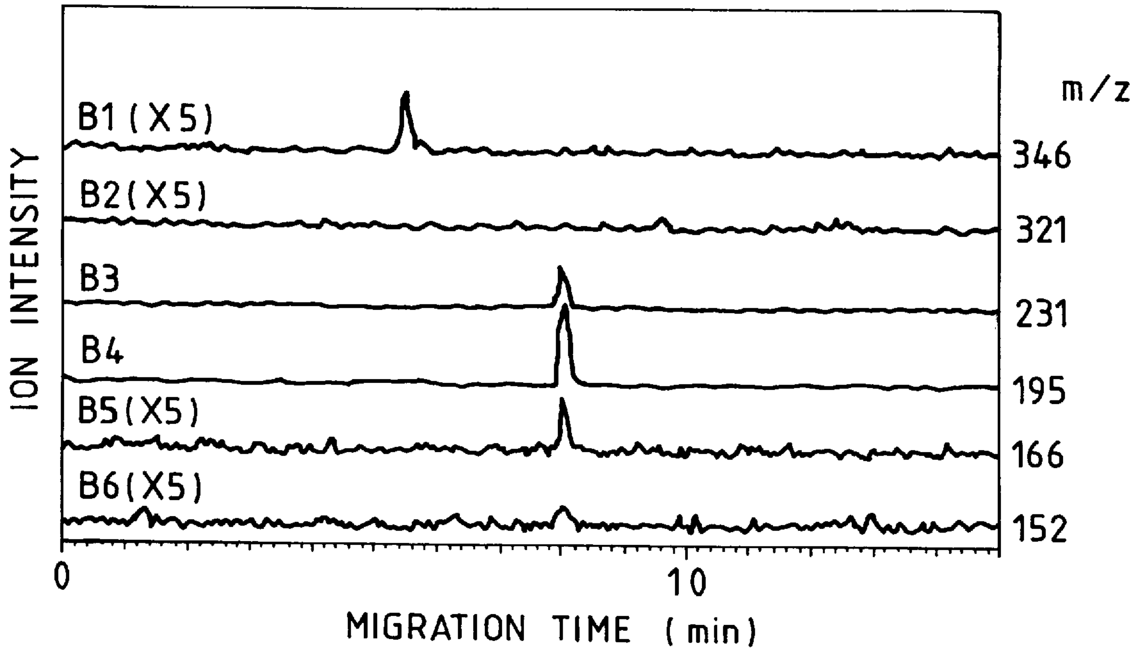
FIG. 15 is a view illustrating a result of measurement for six kinds of cold medicine compounds by a mass spectrometer according to the present invention.

Then, FIG. 15 shows results of measurement for cold drug compounds. Five compounds were detected out of six compounds used as the samples. Among all, the ion intensity for the caffeine (B4) was obtained at a intensity of about twice compared with the case of using the existent electrospray method. Timepidium (B2) not detected in FIG. 15 is an ionic compound, which was detected at a high sensitivity in the existent apparatus using the electrospray method. Further, in the constitution of the apparatus shown in FIG. 2 according to the present invention, four compounds B3 to B6 were not electrophoretically separated but detected at an identical phoretic time simultaneously.

EXAMPLE 11

Figure 13:
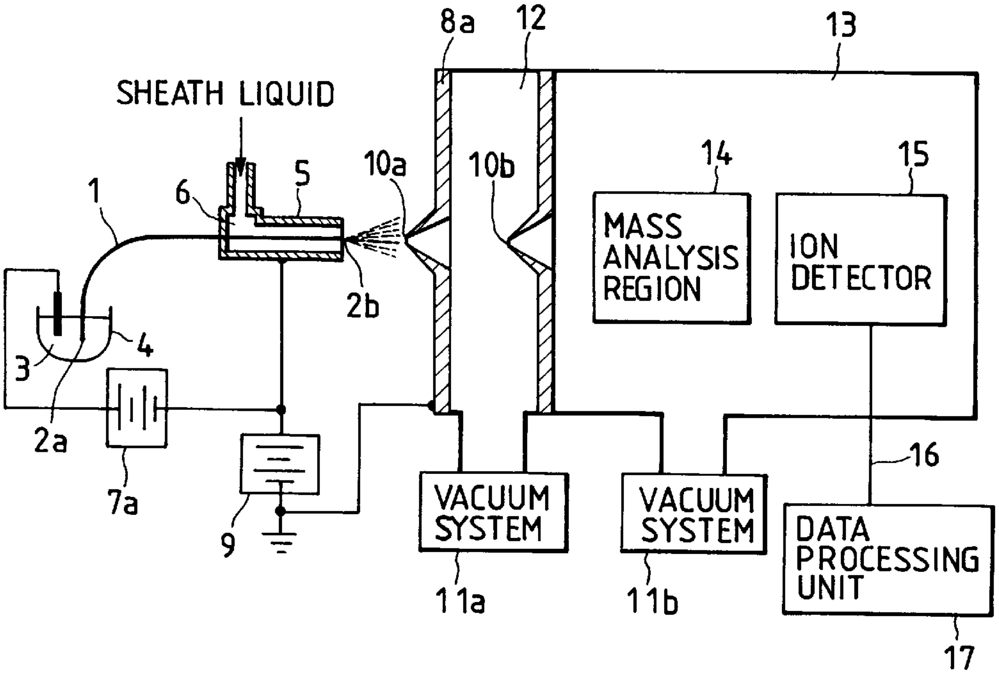
FIG. 13 (PRIOR ART)
FIG. 13 is a view illustrating a schematic constitution of a mass spectrometer combined with an existent capillary electrophoresis apparatus using electrospray ionization method for the ionization of a sample.

Results of the examination for the effect of salts in the buffer solution for caffeine as an object of analysis using the apparatus of the constitution according to the present invention shown in FIG. 2 and the existent apparatus of the constitution shown in FIG. 13 are explained.

In this embodiment, the constitutions of the apparatus shown in FIG. 2 and FIG. 13 were used respectively in the same manner as in Example 5. A sample was introduced by about 2 nl to the capillary 1 by using a hydrostatic injection method. A sodium phosphate buffer solution (20~40 mM, pH 6.6) was used as the electrophoretic mobile phase. In the apparatus shown in FIG. 2 used in this embodiment, methanol was caused to flow (5 μl/min) between the capillary 1 and the metal tube 5 for assisting nebulization, and a sample solution was electrosprayed by applying a voltage at 2.8 kV between the metal tube 5 and the metal block 22. A stainless steel block having a through hole of 5 mm diameter and 60 mm length was used as the metal block 22, and a voltage at 3 kV was applied to the needle electrode 24. In the constitution of the existent apparatus shown in FIG. 13 used in this example, a voltage at 3 kV was applied between the metal tube 5 and the electrode 8*a*, while 50% methanol solution containing 1% formic acid (2 μl/min) was caused to flow between the capillary 1 and the metal tube 5 for assisting nebulization. Other measuring conditions are identical as those in Example 5.

Figure 16:
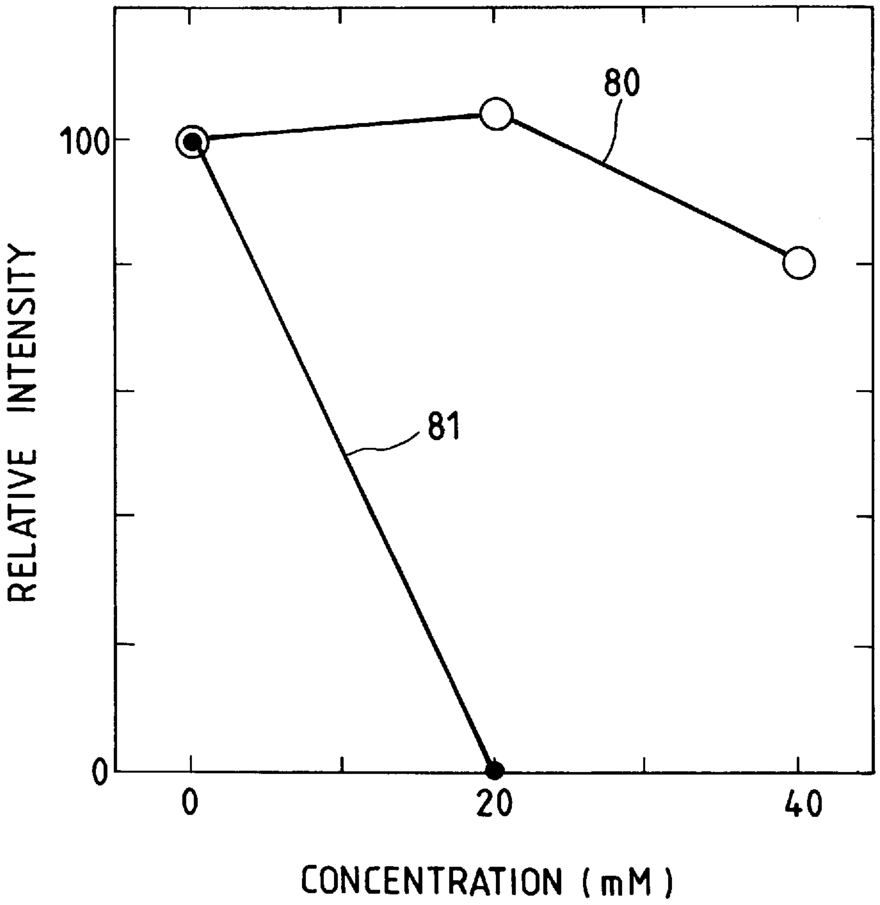
FIG. 16 is a view illustrating a relationship between an ion intensity of protonated caffeine molecule and a concentration of sodium phosphate in a buffer solution measured by a mass spectrometer according to the present invention shown in FIG. 2 and an existent mass spectrometer shown in FIG. 13 respectively.

Caffeine was used as a sample and the change of the ion intensity of caffeine was measured while varying the concentration of the salt in the buffer solution. Electrophoresis was conducted by applying a voltage at 10 kV between both ends of the capillary 1. FIG. 16 shows a relationship between a concentration of sodium phosphate in the buffer solution and the ion intensity of protonated caffeine molecule. The ion intensity was evaluated by the area of the resultant peak, assuming the ion intensity in a case of using a solvent not containing a salt as 100. At the ion intensity 80 measured by the constitution of the apparatus shown in FIG. 2 according to the present invention, there was no strong effect of the sodium phosphate in the buffer solution. On the other hand, at the ion intensity 81 measured by the constitution of the existent apparatus shown in FIG. 13, ions of protonated caffeine molecules could not be monitored in a case of using a 20 mM phosphate buffer solution. In the constitution of the apparatus according to the present invention, since the ionization progress suffers from no strong effect due to the presence of the salt, a buffer solution containing a less volatile salt at a high concentration can be used as a separation solvent. Accordingly, it can be seen that a wider arrange of analysis is possible by the mass spectrometer according to the present invention compared with the existent apparatus using only the electrospraying method.

Figure 17A:
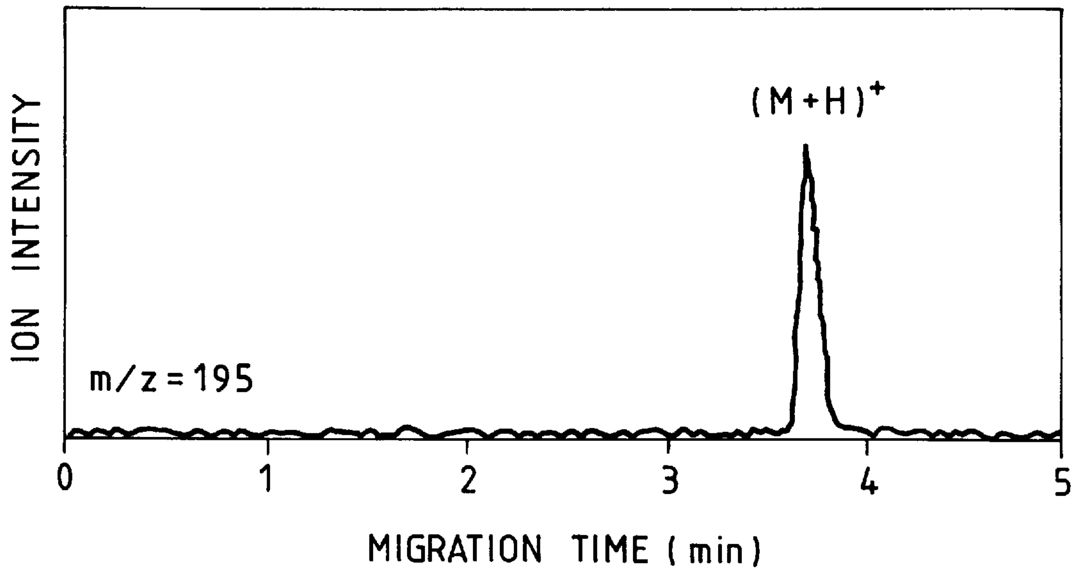
FIG. 17A is a view illustrating an electropherogram for caffeine measured by using a mass spectrometer according to the present invention.
Figure 17B:
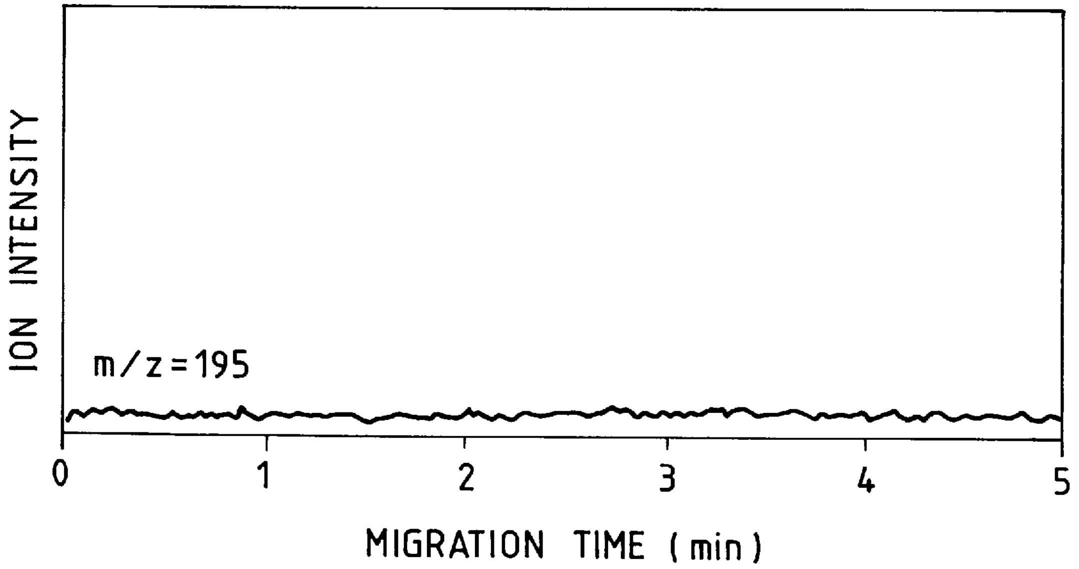
FIG. 17B is a view illustrating an electropherogram for caffeine measured by using an existent mass spectrometer.

FIG. 17A and FIG. 17B show electropherograms for caffeine when a 20 mM phosphate buffer solution is used. FIG. 17A shows an electropherogram measured by the constitution of the apparatus according to the present invention as shown in FIG. 2, while FIG. 17B shows an electropherogram measured by the constitution of the existent apparatus shown in FIG. 13. The sample concentration was defined as $10^{-3}$M and the amount of the sample introduced was set to 2 pmol. Caffeine could not be detected by the constitution of the existent apparatus shown in FIG. 13, whereas a distinct peak of caffeine was obtained in the constitution of the apparatus according to the present invention shown in FIG. 2.

Then, results of measurement for caffeine, as well as theophylline and theobromine as metabolic products thereof using the capillary electrophoresis method or the micellar electrokinetic chromatographic method as the sample separation means will now be explained.

The micellar electrokinetic chromatography is a method of forming micelles of a surfactant in a buffer solution and separating the sample molecules by utilizing the difference of distribution thereof to the micelles. Since this method can separate also molecules not having charges, it is known as a separation mode of high general applicability and is expected as a method of measuring environment polluting compounds such as analysis for environmental water containing a lot of contaminant ions. For forming the micelles, it is necessary to add a surfactant in an amount exceeding critical micelle concentration (CMC). Since sodium dodecyl sulfate (SDS) as one of surfactants used most frequently in micellar electrokinetic chromatography has about 8 mM of CMC in purified water, it is added under usual analysis conditions at a concentration of several tens mM in the buffer solution.

Caffeine, theophylline and theobromine were dissolved each at 1 mg/ml concentration to prepare a sample solution. Capillary electrophoresis or micellar electrokinetic chromatography was used for the sample separation and measurement was conducted by using the constitution of the apparatus shown in FIG. 2 which is identical with that used upon measurement in FIG. 16. Electrophoresis was conducted by applying a voltage at 5 kV between both ends of the capillary.

Figure 18A:
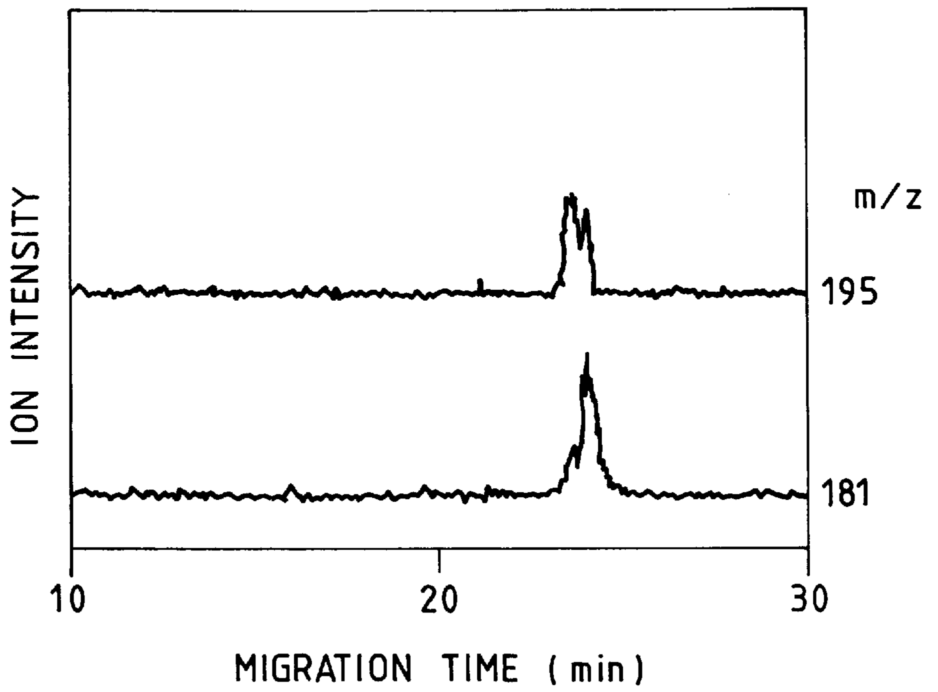
FIG. 18A is an electropherogram illustrating an example for the result of mass analysis of caffeine and its related compounds separated by using capillary electrophoresis by a mass spectrometer according to the present invention.
Figure 18B:
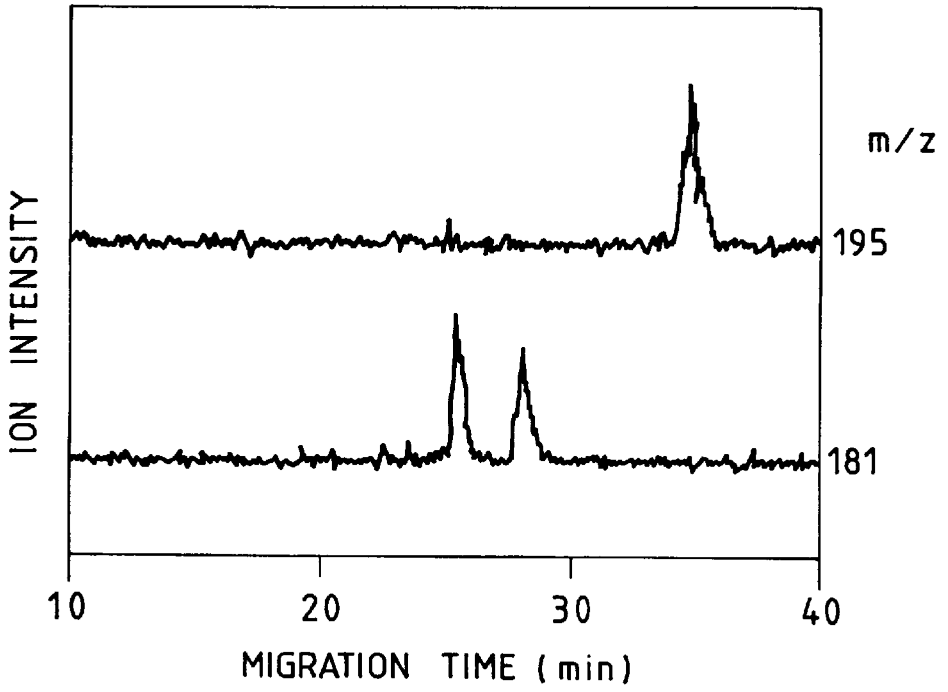
FIG. 18B is an electropherogram illustrating an example for the result of mass analysis of caffeine and its related compounds separated by using micellar electrokinetic chromatography by a mass spectrometer according to the present invention.

Theophylline and theobromine are isomers and have identical molecular weight. FIG. 18A shows results of analyzing caffeine, theophylline and theobromine by using a 25 mM phosphate buffer solution and using a capillary electrophoresis method. FIG. 18B shows results of analyzing caffeine, theophylline and theobromine by adding 50 mM of SDS to a 25 mM phosphate buffer solution and using micellar electrokinetic chromatography. As apparent also from FIG. 18A, the three compounds were not separated substantially and observed substantially at an identical migration time by a capillary electrophoretic method using a 25 mM phosphate buffer solution. This is because the three compounds used as the sample have molecular structures closely similar to each other and have no electric charges in the buffer solution used. On the other hand, as shown in FIG. 18B, in a case of using micellar electrokinetic chromatography, ions derived from caffeine (m/z~195), theophylline (m/z~181) and theobromine (m/z~181) were distinctly separated and observed at migration times different from each other. This is because the capacity factor of each of the sample molecules to the SDS micelles is different. That is, since the three compounds used as the sample have no electric charges, they migrate toward the cathode by the electroosmotic flow. The SDS micelles migrate toward the anode since they have negative electric charges. Under the analysis conditions used herein, since the flow rate of the electroosmotic flow is greater than the migration rate of the micelles, the solvent and the solute (sample molecule, SDS micelle) in the capillary are migrated as a whole toward the cathode. In this case, the sample molecules interact with the micelles, and a sample having a greater capacity factor to the micelle reaches the distal end of the capillary at a later time.

As apparent from the foregoings, according to the present invention, molecules of neutral sample not having electric charges in a solution can be ionized and mass analyzed. Further, an electrophoretic buffer, which was difficult to be used in the existent mass spectrometer combined with the capillary electrophoretic apparatus, can be used in accordance with the present invention. Therefore, the range of application of the mass spectrometer combined with the sample separation means such as the capillary electrophoretic apparatus is widened and more substances can be analyzed.

It is further understood by those skilled in the art that the foregoing description is a preferred embodiment of the disclosed device and that various changes and modifications may be made in the invention without departing from the spirit and scope thereof.

What is claimed is:

1. A mass spectrometer comprising:

a nebulization means for nebulizing a solution containing molecules of a sample from an end of a capillary disposed in a metal tube by way of an electroconductive solution under an atmospheric pressure and forming liquid droplets, a vaporization means for vaporizing the liquid droplets to form gaseous molecules of the sample under the atmospheric pressure, a chemical ionization means for forming ions relevant to the molecules of the sample under an atmospheric pressure or a reduced pressure by chemical reaction between ions attributable to gaseous molecules present under the atmospheric pressure or the reduced pressure and the gaseous molecules of the sample, and a vacuum region having a sample aperture for introducing ions formed by the chemical ionization means and incorporating a sample analysis means for mass analysis of the ions introduced from the sample aperture, wherein the nebulization means is a heating member having a through hole through which the heated gas is caused to flow, and wherein a plate or mesh-like electrode is disposed at the inside of the through hole between the end of the capillary and the chemical ionization means and means for applying a voltage between the metal tube and the electrode is added, whereby the solution containing the molecules of the sample is electrosprayed.

2. A mass spectrometer comprising:

a nebulization means for nebulizing a solution containing (1) ions and (2) molecules of a sample from an end of a capillary disposed in a metal tube by way of an electroconductive solution under an atmospheric pressure and forming liquid droplets, a vaporization means for vaporizing the liquid droplets to form (1) gaseous ions and (2) gaseous molecules of the sample under the atmospheric pressure, a chemical ionization means for forming ions relevant to the molecules of the sample under an atmospheric pressure or a reduced pressure by chemical reaction between ions attributable to gaseous molecules present under the atmospheric pressure or the reduced pressure and the gaseous molecules of the sample, and a vacuum region having a sample aperture for introducing ions formed by the chemical ionization means and incorporating a sample analysis means for mass analysis of the ions introduced from the sample aperture, wherein the nebulization means is a heating member having a through hole through which the heated gas is caused to flow, wherein a plate or mesh-like electrode is disposed at the inside of the through hole between the end of the capillary and the chemical ionization means and means for applying a voltage between the metal tube and the electrode is added, whereby the solution containing the molecules of the sample is electrosprayed, and wherein the chemical ionization means includes ion blocking means for preventing the gaseous ions produced by the vaporization means from being introduced by the sample aperture with the ions formed by the chemical ionization means, thereby preventing the sample analysis means from analyzing masses of the gaseous ions produced by the vaporization means.

3. A mass spectrometer comprising:

sample supplying means for supplying a sample solution, the sample solution including a solvent, ions, and a solute, the solute being a sample to be analyzed;

ion converting means, disposed after the sample supplying means, for converting the ions in the sample solution into gaseous ions;

sample ionizing means, disposed after the ion converting means, for ionizing the sample in the sample solution, thereby producing sample ions;

mass analyzing means for analyzing masses of the sample ions produced by the sample ionizing means; and ion blocking means for preventing the gaseous ions produced by the ion converting means from reaching the sample ionizing means, thereby preventing the mass analyzing means from analyzing masses of the gaseous ions produced by the ion converting means;

wherein the ion converting means includes nebulization means for nebulizing the sample solution from an end of a capillary disposed in a metal tube by way of an electroconductive solution under an atmospheric pressure and forming liquid droplets;

wherein the nebulization means is a heating member having a through hole through which the heated gas is caused to flow; and wherein a plate or mesh-like electrode is disposed at the inside of the through hole between the end of the capillary and the sample ionizing means and means for applying a voltage between the metal tube and the electrode is added, whereby the sample solution is electrosprayed.

4. A mass spectrometer according to claim 3, wherein the sample supplying means includes a sample separation apparatus for separating the sample into individual molecules.

5. A mass spectrometer according to claim 4, wherein the sample separation apparatus is a capillary electrophoresis apparatus.

6. A mass spectrometer according to claim 3, wherein the sample ionizing means ionizes the sample by subjecting the sample to a chemical ionizing process.

7. A mass spectrometer according to claim 3, wherein the ion blocking means prevents the gaseous ions produced by the ion converting means from reaching the sample ionizing means by deflecting the gaseous ions with an electric field.

* * * * *